United States Patent
Diehl et al.

(10) Patent No.: US 8,371,783 B2
(45) Date of Patent: Feb. 12, 2013

(54) SPACER ELEMENT FOR THE ATTACHMENT OF A SHEET METAL PART, COMPONENT ASSEMBLY AND METHOD FOR ITS MANUFACTURE

(75) Inventors: Oliver Diehl, Bad Homburg (DE); Richard Humpert, Bad Nauheim (DE)

(73) Assignee: PROFIL-Verbindungstechnik GmbH & Co. KG (DE)

( * ) Notice: Subject to any disclaimer, the term of this patent is extended or adjusted under 35 U.S.C. 154(b) by 530 days.

(21) Appl. No.: 12/606,184

(22) Filed: Oct. 26, 2009

(65) Prior Publication Data

US 2010/0124471 A1 May 20, 2010

(30) Foreign Application Priority Data

Oct. 27, 2008 (DE) .......................... 10 2008 053 346

(51) Int. Cl.
*F16B 37/04* (2006.01)
(52) U.S. Cl. .......................... 411/103; 411/127; 411/187
(58) Field of Classification Search .................... 411/81, 411/103, 104, 127, 177, 178; 16/2.4, 93 R, 16/94 R, 96 R, DIG. 31; 52/364, 710, 787.1
See application file for complete search history.

(56) References Cited

U.S. PATENT DOCUMENTS

| | | | |
|---|---|---|---|
| 1,835,243 A | 12/1931 | Schaffert | |
| 2,545,752 A | 3/1951 | Singleton | |
| 2,562,336 A | 7/1951 | Selden | |
| 2,767,877 A | 10/1956 | Newsom | |
| 2,825,380 A * | 3/1958 | Reiner | 411/113 |
| 2,861,618 A * | 11/1958 | Tinnerman | 411/175 |
| 3,042,156 A | 7/1962 | Rohe | |
| 3,078,002 A | 2/1963 | Rodgers, Jr. | |
| 3,299,500 A * | 1/1967 | Double | 29/432.2 |
| 3,563,183 A | 2/1971 | Rich | |
| 4,449,878 A | 5/1984 | Hallock | |
| 4,722,647 A * | 2/1988 | Sawdon | 411/180 |
| 4,861,182 A * | 8/1989 | Gillet | 403/264 |
| 4,934,861 A | 6/1990 | Weeks | |

(Continued)

FOREIGN PATENT DOCUMENTS

| | | |
|---|---|---|
| DE | 3 936 376 C1 | 3/1991 |
| EP | 07 59 510 B1 | 2/1997 |

(Continued)

OTHER PUBLICATIONS

German Search Report corresponding to DE 10 2008 053 346.7 dated Sep. 2, 2009.

(Continued)

*Primary Examiner* — Roberta Delisle
(74) *Attorney, Agent, or Firm* — Hershkovitz & Associates, LLC

(57) ABSTRACT

A spacer element which is designed at both ends for the attachment to a sheet metal part or to a hollow section for the formation of a component assembly and which optionally has a fastener section with an internal thread or external thread for the attachment of a component to the component assembly by means of a screw or a nut, is characterized in that the spacer element is not deformable or at least substantially not deformable on attachment to the sheet metal part or to the hollow section and in that the spacer element is provided at both end faces with respective undercuts for the form-fitted reception of sheet metal material or of the wall material, whereby the spacer element is secured to the sheet metal part or to the hollow section and preferably also secured against rotation. Various variants, component assemblies and methods are likewise described and claimed.

3 Claims, 7 Drawing Sheets

U.S. PATENT DOCUMENTS

| | | | |
|---|---|---|---|
| 5,040,917 A | 8/1991 | Camuffo | |
| 5,528,812 A | 6/1996 | Muller | |
| 5,628,598 A * | 5/1997 | Hofle | 411/85 |
| 5,682,678 A | 11/1997 | Gallagher | |
| 5,685,663 A | 11/1997 | Sadri | |
| 6,188,039 B1 | 2/2001 | Gass | |
| 6,997,659 B2 * | 2/2006 | Vrana et al. | 411/179 |
| 7,237,996 B2 * | 7/2007 | Vrana | 411/180 |
| 2005/0147481 A1 * | 7/2005 | Wojciechowski et al. | 411/180 |
| 2005/0158141 A1 * | 7/2005 | Shinjo | 411/180 |
| 2005/0226702 A1 * | 10/2005 | Ladouceur | 411/427 |
| 2006/0222473 A1 * | 10/2006 | Ladouceur | 411/180 |

FOREIGN PATENT DOCUMENTS

| | | |
|---|---|---|
| EP | 0 957 273 B1 | 11/1999 |
| EP | 1 068 458 B1 | 1/2001 |
| EP | 1 111 251 A1 | 6/2001 |
| GB | 2 184 156 | 6/1987 |

OTHER PUBLICATIONS

English language translation of German Search Report corresponding to DE 10 2008 053 346.7 dated Sep. 2, 2009.

* cited by examiner

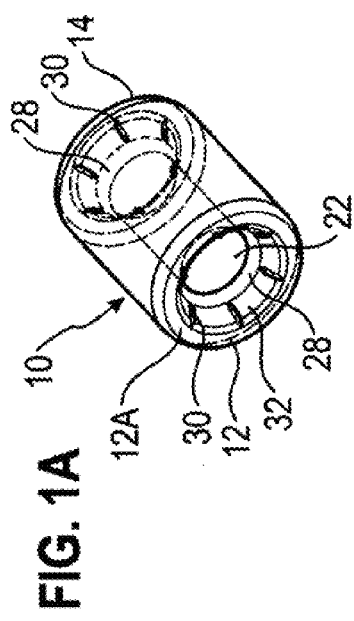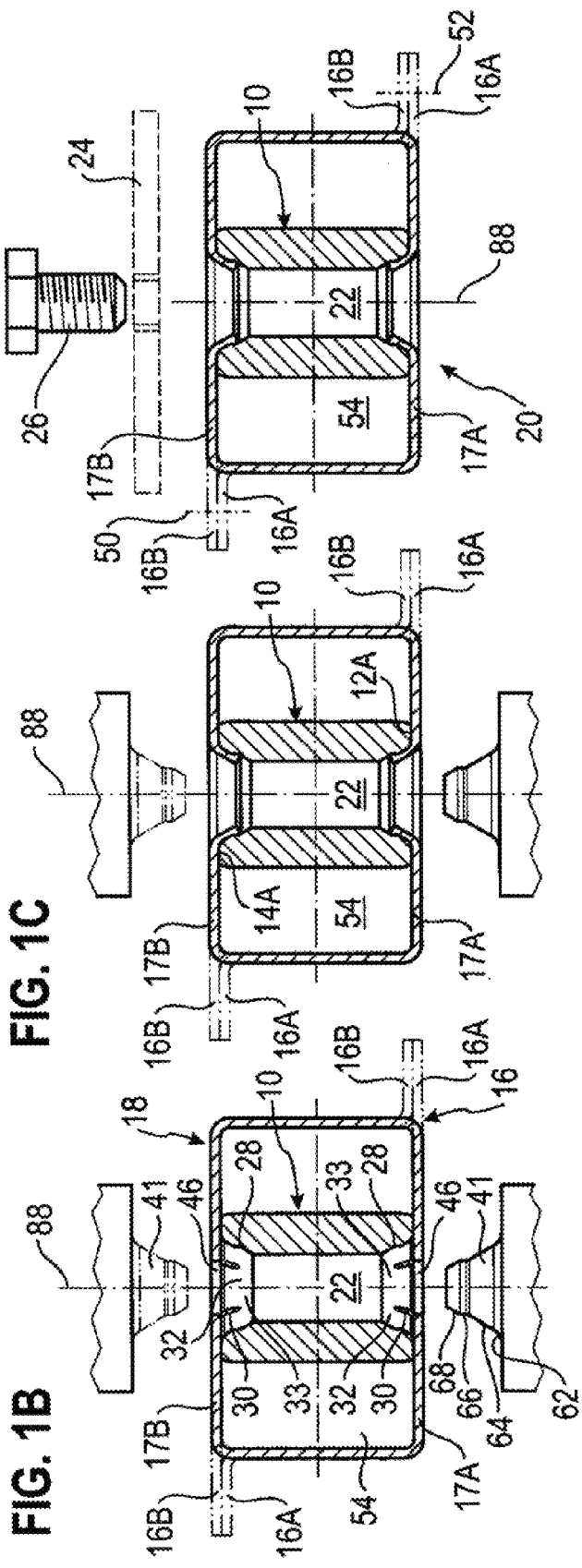

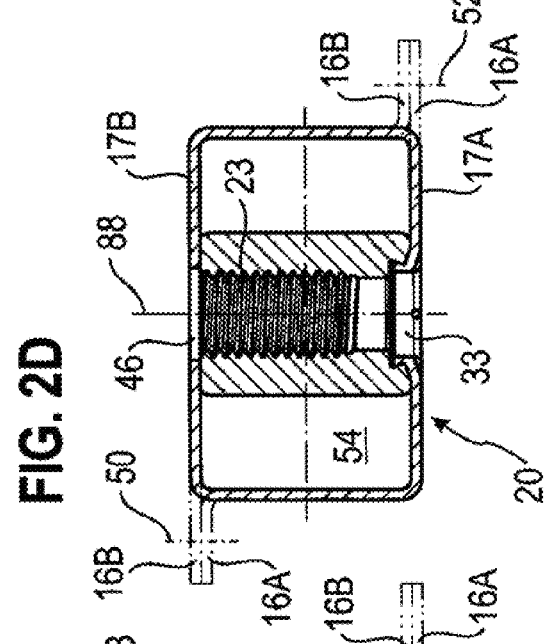
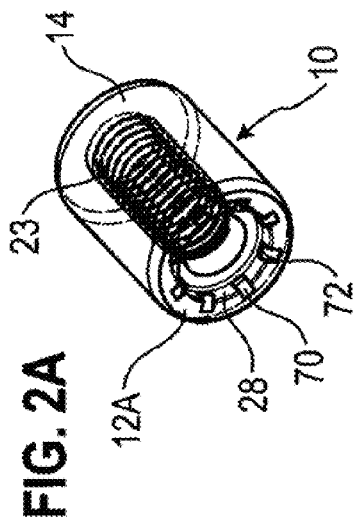
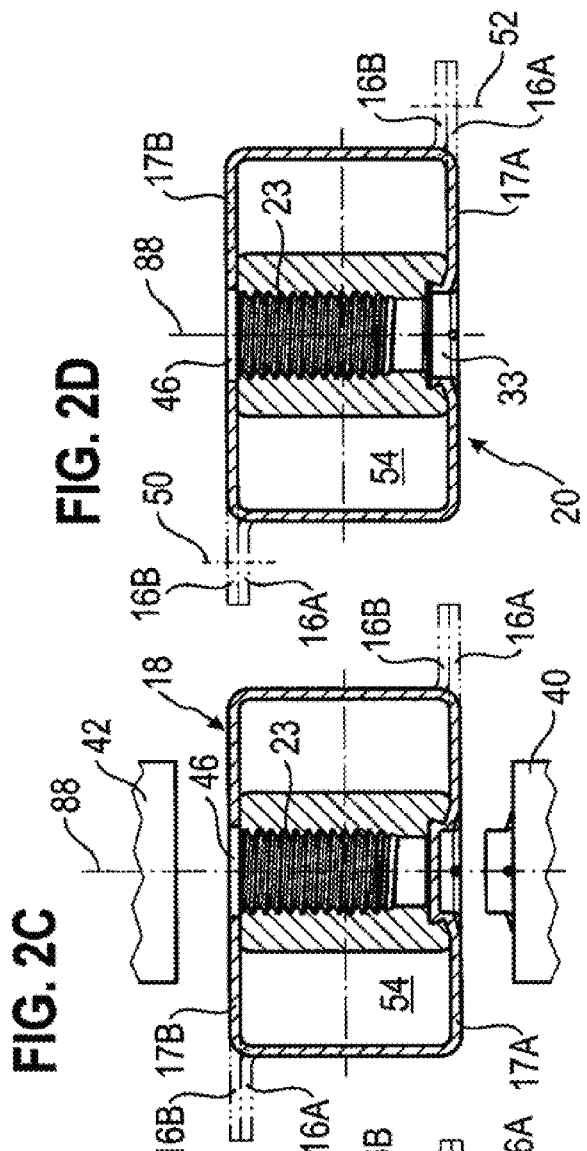
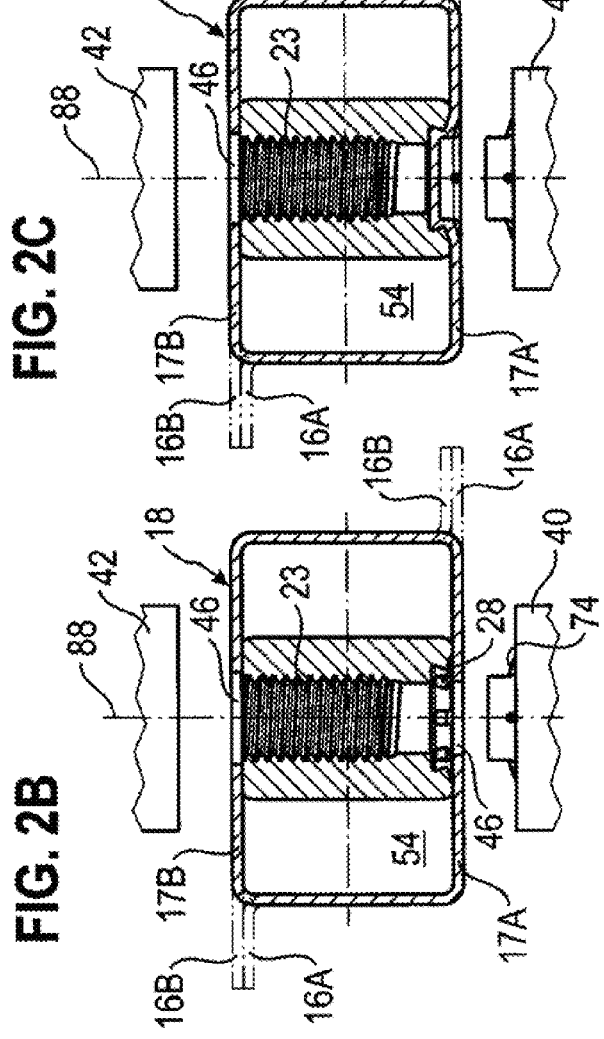

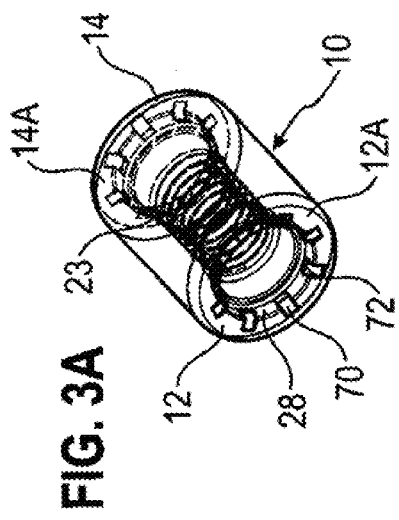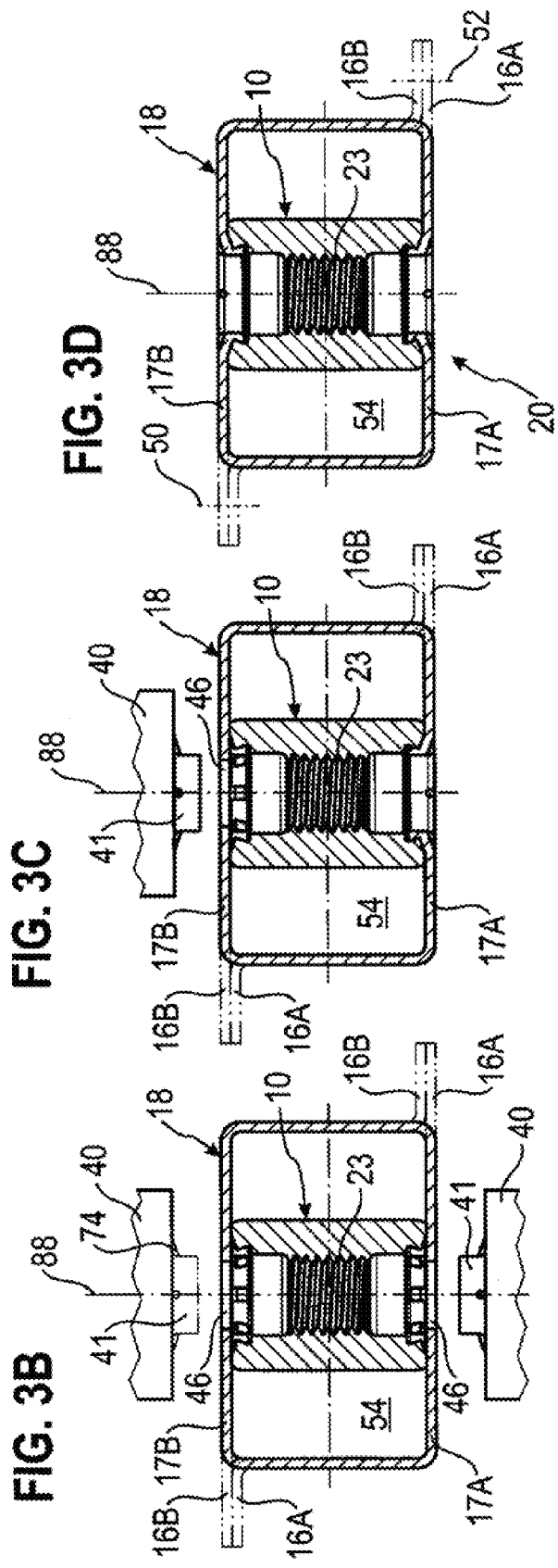

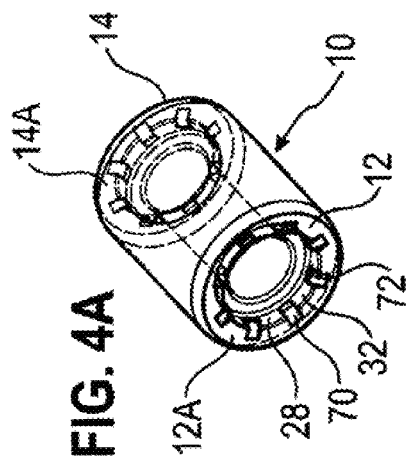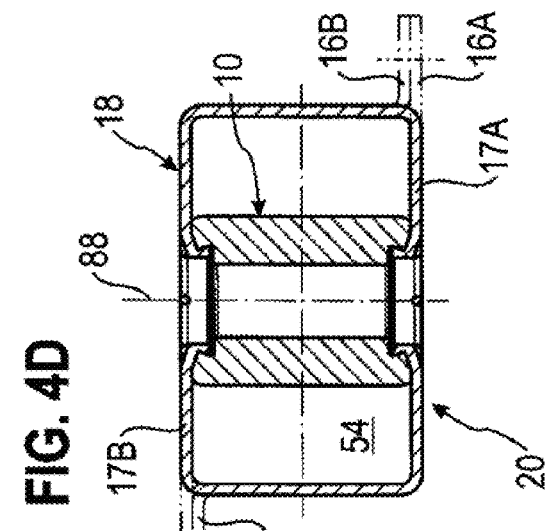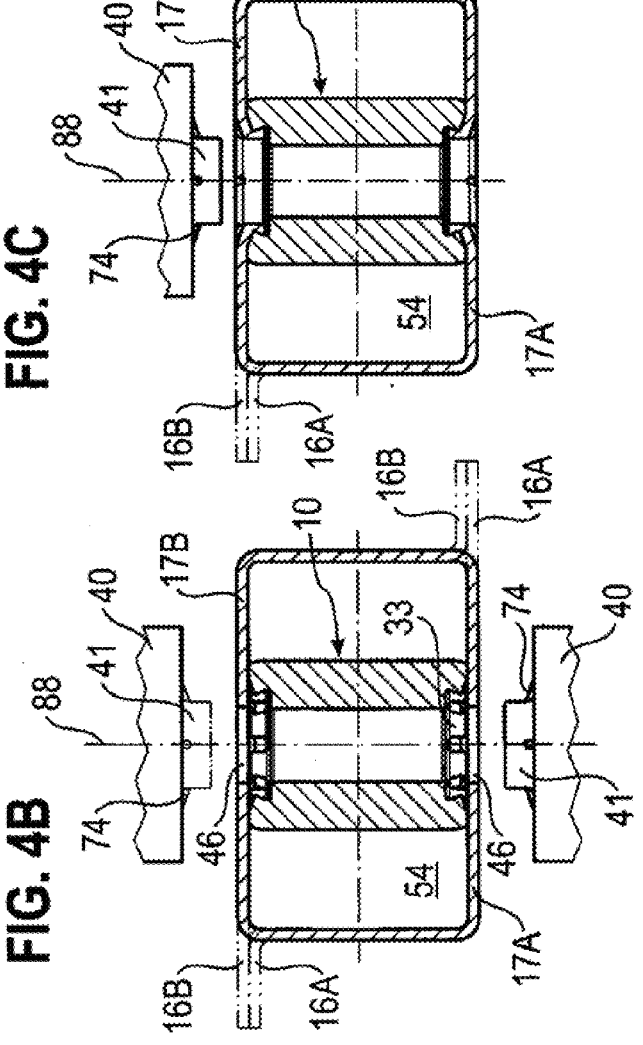

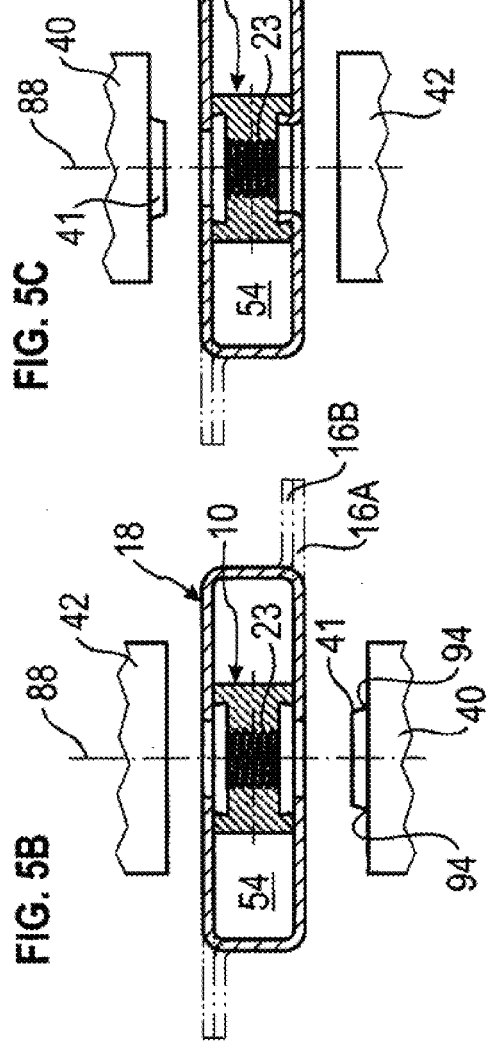

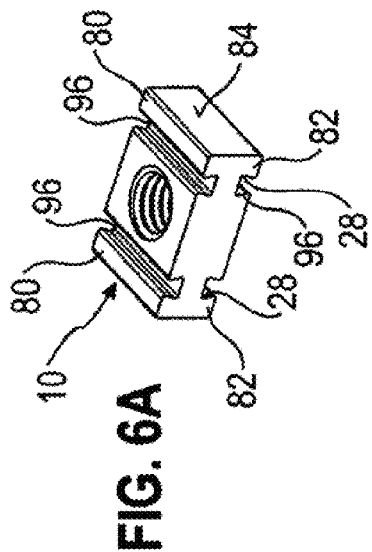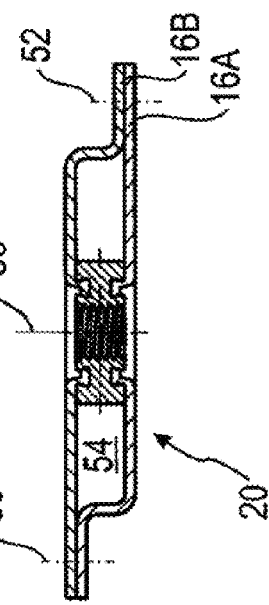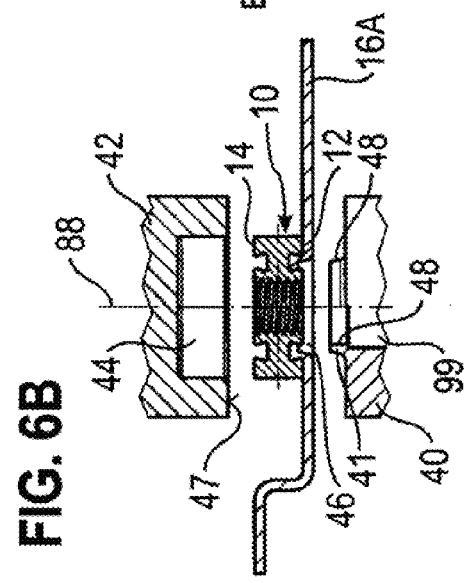

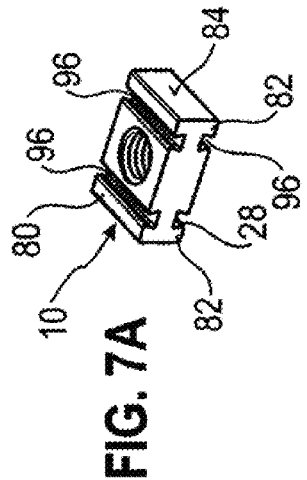
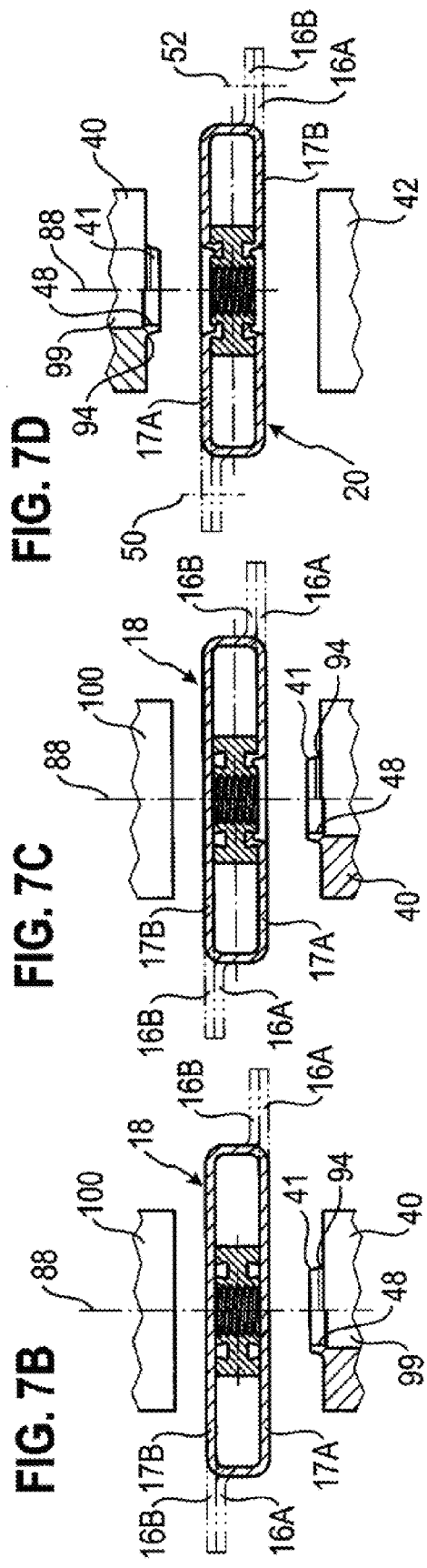

SPACER ELEMENT FOR THE ATTACHMENT OF A SHEET METAL PART, COMPONENT ASSEMBLY AND METHOD FOR ITS MANUFACTURE

The present invention relates to a spacer element which is designed for attachment to a sheet metal part for the formation of a component assembly and also to a corresponding component assembly and a method of manufacture of such a component assembly.

A spacer element of this kind is known from EP-B-1068458. There the spacer element is designed at both ends for the attachment to a sheet metal part for the formation of a component assembly and has a fastener section with an internal thread or an external thread for the attachment of a component to the component assembly by means of a bolt or a nut respectively. The spacer element is used there in the hollow cavity of a sheet metal part which is normally defined by two sheet metal parts which are welded together for the formation of the hollow cavity. Such sheet metal constructions are frequently met in motorcar construction or in coachwork, for example in the manufacture of frame parts, sills and pillars. Such spacer elements bring about a stiffening to the corresponding component and enable in addition the attachment of a further component to the component assembly. For example by way of the spacer element a door hinge, a pivot device for a safety belt or a wheel suspension can be attached to such a spacer element i.e. to the part stiffened by it and having a hollow cavity.

The hollow cavity need not necessarily be formed by two sheet metal parts welded to one another but rather can be formed by the hollow cavity of a hollow section or tube, for example a tube with rectangular cross-section, the spacer element could then connect two oppositely disposed wall sections of the tube. It is however also known to secure a spacer element of this kind only at one of its two ends to a wall section of a sheet metal construction forming a hollow cavity with the inner side of the oppositely disposed wall section contacting the other end of the spacer element. When a component is screwed onto the outer side of the oppositely disposed wall section, for example by a bolt which is screwed into the internal thread of a spacer element, the oppositely disposed wall section is clamped between the free end of the spacer element and the component so that a firm connection of the spacer element at the oppositely disposed wall section is superfluous, assuming that the corresponding bolt is correctly tightened to secure the component.

Thus two cases can be distinguished. Either the spacer element is connected at two ends in form-fitted manner to two oppositely disposed wall sections defining a hollow cavity between them or is connected in form-fitted manner only at one end to one of the opposing wall sections, with the spacer element only contacting the other wall section.

With the known spacer element the form-fitted connection takes place by a riveting process such that a rivet section provided at each end face of the spacer element is re-shaped into a rivet bead. An advantage of the above-named spacer element in comparison to other known mechanically joined spacer elements lies in the fact that it is so designed that the desired spacing can be relatively accurately maintained.

The object of the present invention is to provide a different type of spacer element and also component assemblies and methods for their manufacture which enable an even more precise observation of a pre-set spacing and which in addition ensure a flat screwed joint surface relatively free of distortions and deformations and which is intended to have excellent security against rotation, with the spacer element however being able to be manufactured at favourable costs and having good mechanical characteristics.

In order to satisfy this object there is provided, in accordance with the invention and a first aspect of the present invention a spacer element which is designed at both ends for the attachment to a sheet metal part or to a hollow section for the formation of a component assembly and which optionally has a fastener section with an internal thread or external thread for the attachment of a component to the component assembly by means of a screw or a nut, with the spacer element being characterized in that it is not deformable or at least substantially not deformable on attachment to a sheet metal part and in that the spacer element is provided at both end faces with respective undercuts for the form-fitted reception of sheet metal material, whereby the spacer element is anchored to the sheet metal part and preferably also secured against rotation.

This aspect of the invention can be used both for a spacer element which is used to secure a component to a component assembly but also for spacer elements which are to have a pure spacer function and accordingly do not require a fastener section. In the latter case it is favourable when the spacer element is secured at both end faces to sheet metal parts.

In accordance with the second aspect of the present invention there is provided a spacer element which is designed at one end for the attachment to a sheet metal part or to a hollow section for the formation of a component assembly and which optionally has a fastener section with an internal thread or external thread for the attachment of a component to the component assembly by means of a bolt or a nut, with the special characterization that the spacer element is not deformable or at least substantially not deformable on attachment to the sheet metal part and that the spacer element is provided at one end face with at least one undercut for the form-fitted reception of the sheet metal material of the wall material, whereby the spacer element is anchored to the sheet metal part and preferably secured against rotation.

In the designs in accordance with the two aspects of the invention the spacer element, which is not deformable always has the same length both before and also after the attachment of a sheet metal part so that the desired spacing between the two oppositely disposed wall sections of the sheet metal part or of the hollow section defining the hollow space can be precisely maintained. This advantage can only be achieved with reservations using a spacer element which is attached at its two ends to corresponding wall sections by re-shaping corresponding rivet sections of the spacer element. Furthermore, by the forming of the material of the wall sections into respective recessed mounts of the spacer element a planar screwed joint surface is provided whereby the attachment of a further component to the component assembly formed by the spacer element and the sheet metal part is substantially simplified.

The spacer element preferably has a central recess within a ring-like contact surface at one or at each end face and also at least one undercut in the sidewall of the recess.

The undercut can be a ring-like undercut and/or the sidewall of the central recess can extend at least substantially obliquely to the longitudinal axis so that the recess has in an axial section, i.e. a plane containing the longitudinal axis, optionally the form of a concave throat, with an at least substantially conical shape, optionally a concavely or convexly rounded arched shape, with a rounded transition preferably being present at the end face of the spacer element from the ring-like contact surface to the central recess.

An embodiment with only one ring-like undercut in each recess is completely simple to manufacture but offers itself no pronounced security against rotation so that such a security against rotation, which is necessary with a spacer element with a fastener element function (not however with a pure spacer element) must be achieved by other measures such as noses and/or recesses providing security against rotation. This can be particularly favourably brought about by a spacer element which has a plurality of recesses spaced from one another or a groove of wave-shaping plane view in the ring-shaped contact surface which form corresponding discrete undercuts in the sidewall of the central recess, with both the recesses and the wave-shaped groove and the projections of the sidewall formed by them or by it, which form the undercuts, also serving for the security against rotation.

In other words the spacer element in this example has a formation at both end faces which correspond to a so-called RSU element of the present applicants as described in EP-B-759510 and in EP-B-957273.

The spacer element can have a smooth pierced cylindrical bore or hole which is optionally designed to receive a thread forming or thread cutting bolt. I.e. the thread does not have to be pre-cut but can be produced after the installation of the spacer element into the hollow cavity during screwing on of the further component by means of the corresponding bolt. The excellent security against rotation which is achieved at both ends of the spacer element ensures that rotary slippage of the spacer element is precluded.

The spacer element preferably has elongate features providing security against rotation such as noses and/or recesses which extend in radial planes, i.e. planes perpendicular to the longitudinal axis, and which are preferably provided at the sidewall of the ring-like recess. Such features providing security against rotation are simply manufactured and ensure excellent security against rotation, i.e. prevent the spacer element turning relative to the sheet metal part, for example when a bolt is screwed into or out of the spacer element.

A further embodiment is characterized in that the spacer element is rectangular or square in axial cross-section and has two bars at the one end face or at both end faces which extend parallel to one another and to the neighbouring side of the spacer element and form respective undercuts at the two mutually confronting sides. Rectangular elements having such a shape at one end face are known as fastener elements but have not hitherto been used as spacer elements.

A further embodiment of the initially named kind in accordance with the invention is characterized in that the two bars are formed by respective grooves and in that preferably both sides of each groove each have a respective undercut.

The invention will subsequently be explained in more detail with reference to embodiments and to the drawings in which are shown:

FIG. 1A a perspective representation of a first embodiment of a spacer element in accordance with the invention, FIGS. 1B, 1C an attachment of the element in accordance with the invention of FIG. 1A in the hollow cavity of a sheet metal part or of a hollow section, FIG. 1D the completed component assembly, FIGS. 2A-2D diagrams which correspond to the FIGS. 1A-1D but of a different spacer element in accordance with the invention, FIGS. 3A-3D diagrams which correspond to FIGS. 1A-1D but of another spacer element in accordance with the invention, FIGS. 4A-4D diagrams which correspond to FIGS. 1A-1D but of another spacer element in accordance with the invention, FIGS. 5A-5D diagrams which correspond to FIGS. 1A-1D but of another spacer element in accordance with the invention, with the additional FIG. 5E showing a partly cut away perspective representation of the completed component assembly in accordance with FIG. 5D, FIGS. 6A-6D diagrams which correspond to FIGS. 1A-1D but of a different spacer element in accordance with the invention, and FIGS. 7A-7D diagrams which correspond to FIGS. 1A-1D but of another spacer element in accordance with the invention.

Referring to FIG. 1A a first spacer element 10 in accordance with the invention is shown there which is designed at both ends 12, 14, i.e. at the end faces, for the attachment to a sheet metal part 16 or to a hollow section 18 (FIG. 1B) for formation of a component assembly 20 (FIG. 1D). The spacer element shown here has a central bore 22 and is intended as a pure spacer element, i.e. it has no fastener section. It would however be entirely possible to provide the spacer element with a fastener section with an internal thread or an external thread for the attachment of a component to the component assembly by means of a bolt or a nut respectively or to design the central bore 22 in such a way that it can receive a thread forming or thread cutting bolt. In these two latter case the spacer element will then not only have the function of a spacer element but rather it could also serve for the attachment of a further component 24 to the component assembly by means of the corresponding bolt 26. The attachment of such a component will also be possible with a bolt which is passed from one side through the component and the bore and is secured at the other side of the hollow section of the sheet metal part by a nut. When it is stated here that the spacer element is provided with an external thread in the fastener section then this is to be understood in such a way that a shaft part having a thread projects from one end face of the spacer element and is surrounded at this end face by a contact surface and optionally a ring recess with an undercut or a plurality of undercuts, with the shaft part projecting through a hole in the wall of the sheet metal part or of the hollow section.

The spacer element 10 is at least substantially not deformable on the attachment to a sheet metal part 16 or to a hollow section 18. At the two end faces 12, 14 the spacer element is provided with respective ring-like undercuts 28 for the form-fitted reception of a sheet metal part, whereby the spacer element 10 is secured to the sheet metal part 16 or to the hollow section 18. The attachment can also be executed in a manner secure against rotation and indeed by noses 30 providing security against rotation (and/or recesses providing security against rotation) which are provided here in radial planes, i.e. in planes perpendicular to the longitudinal axis, at a sidewall 32 of a central cut-out or recess 33 containing the undercut 28, with a corresponding central cut-out or recess 33 which is surrounded by respective ring-like contact surfaces 12A and 14A being provided at both ends 12, 14 of the spacer element 10.

Various methods are possible for the manufacture of a component assembly in accordance with FIG. 1D which will now be explained with reference to FIGS. 6A to 6D. Although the spacer element 10 in accordance with FIGS. 6A to 6D is designed differently from the spacer element 10 in accordance with FIGS. 1A to 1D the concepts explained here apply exactly in the same way for the embodiment of FIGS. 1A to 1D and for all further spacer elements in accordance with FIGS. 2 to 5 and 7. In FIG. 6A a first sheet metal part 16A is attached to the first end face 12 of a spacer element 10 by means of a first die button 40 which presses the sheet metal material in form-fitted manner into the corresponding undercut or undercuts 28 of the first end face 12.

The use of the die button 40 in accordance to FIG. 6B preferably takes place in a press in conjunction with a plunger 42 of a setting head which receives the spacer element 10, with the setting head having a cut-out 44 which is dimensioned such that it fully receives the spacer element 10 and the lower end face 12 of the element lies in a plane with the lower end face 47 of the plunger 42. The die button 40 can for example be arranged at the lower tool of a press or at the intermediate platten of the press whereas the setting head or the plunger 42 is arranged at the intermediate platten of the press or at the upper tool. An inverted arrangement is also possible, i.e. the die button 40 can be arranged facing downwardly at the upper tool of the press or at the intermediate platten of the press whereas the setting head or the plunger 42 is arranged facing upwardly at the intermediate platten of the press or at the lower tool respectively.

During the closing of the press the die button 40, i.e. the die button projection 41 presses the sheet metal material into the undercuts 28. The attachment of the spacer element 10 to the sheet metal part 16A can also take place in a station of a progressive tool, for example in an arrangement, where the hole 46 in the sheet metal part 16A is pierced out in an earlier station of the progressive tool (insofar as the die button 40 is not itself used for this purpose as will be later explained in more detail). It is evident also that the die button 40 has two parallel noses 48 which are obliquely set at their outer sides. In this way the sheet metal material is pressed in a form-fitted manner into the undercuts 28. Alternatively to the use of the die button in a press a so-called C-frame can be used. In an arrangement of this kind either the die button or the plunger is fixedly held at one side of the opening of the C-frame whereas the other respective part, i.e. the plunger or the die button, is hydraulically biased in order to achieve the press-in function.

As shown in FIG. 6C a second sheet metal part 16D is subsequently arranged at the second end face 14 of the spacer element 10. By means of a second die button 40 or, on turning over the component assembly, by means of the first named die button 40, material of the second sheet metal part 16B is pressed in form-fitted manner into the corresponding undercut or undercuts 28 of the second end face 14. The first and second sheet metal parts 16A, 16B are then connected together or to at least one further sheet metal part for the formation of a hollow cavity 54 by other means, for example by spot-welding, mechanical joining or by further fastener or indeed spacer elements. In this example this other connection takes place after the attachment of the second sheet metal part to the second end face of the spacer element. It is however also straightforwardly possible to first secure the two sheet metal parts to one another and to subsequently introduce the spacer element into the so formed hollow cavity 54 as is for example shown with reference to FIGS. 1A to 1D or FIGS. 7A to 7D.

In FIGS. 1A to 1D the spacer element 10 is inserted into the hollow cavity 54 of a hollow section 18 or of a sheet metal part 16 which consists of at least one first sheet metal part 16A and one second sheet metal part 16B which are joined together or with at least one further sheet metal part (not shown) for the formation of a hollow cavity, at positions 50, 52 remote from the spacer element for example by spot-welding, mechanical joining or by further fastener elements or spacer elements. The first and second end faces 12, 14 of the spacer element 10 lie opposite respective first and second wall sections 17A, 17B of the hollow space 54. By means of a suitable die button 40 the spacer element is attached at the first end face 12 to the first wall section 17A having a pre-manufactured hole in such a way that the die button 40 presses material of the first wall section 17A which surrounds the hole 46 into the corresponding undercut 28 of the first end face in form-fitted manner. By means of a second suitable die button 40 the spacer element 10 is attached at the second end face 40 to the second wall section 17B, which likewise has a hole 46, in that the die button presses material of the second wall section 17B which surrounds the hole 46 into the corresponding undercut 28 of the second end face 14 in form-fitted manner. This attachment can take place in different ways. In accordance with a first possibility first and second die buttons 40 are used for the pressing of the first and second wall sections 17A, 17B which—shown in FIG. 1B if one assumes that the upper die button 40 shown there in broken lines is provided in correspondence with the lower die button 40 with a die projection 41—simultaneously takes place from opposite directions in a pressing device. Alternatively to this the one die button, for example the lower die button 40 in FIG. 1B can be used, whereas the upper die button 40 in accordance with FIG. 1C is first used at a later point in time in order to press the material of the wall section 17B into the upper end face 14 of the spacer element. This sequential pressing of wall material into the end faces 12, 14 of the spacer element 10 can take place in one or in more pressing devices, in two stations of a progressive tool. Finally, only one die button 40 can be used when the component assembly is turned over between individual pressing operations.

The form of the die button projection 41 of the die button(s) 40 in accordance with FIGS. 1B and 1C is adapted to the shape of the central recess 33 with undercuts 28, whereby sheet metal material or wall material is pressed into respective undercuts. At the same time sheet metal material i.e. wall material is pressed over the noses 30 providing security against rotation and/or into any recesses providing security against rotation so that the features providing security against rotation are in form-fitted engagement with the sheet metal material or wall material. Strictly speaking one could in this embodiment dispense with a ring-like undercut 28 since the noses and/or recesses providing security against rotation themselves form local undercuts. Actually, for a spacer element the undercut could be omitted altogether because the constraint on axial movement of the spacer can be generated by the two oppositely disposed sides or walls defining the hollow cavity.

The die button projection 41 has here a generally conical shape and consists specifically of a radius 62 in the region of the surrounding end face of the die button, a conical section 64 into which the radius 62 merges gently, a general cylindrical intermediate section 66 and finally a further conical section 68. Since no undercuts are present at the die button projection 41 the finished component assembly in accordance with FIG. 1D can be straightforwardly drawn from the die button 40 of the die buttons 40 on opening of the pressing device.

These different variants of the use of the die button 40 apply for all further embodiments, which is why the same reference numerals will be used for the same parts and have the same meaning unless something to the contrary is stated. This statement applies not only to the die buttons but rather also for all features of the spacer elements, component assemblies and method described here.

As already explained above the spacer element 10 of FIG. 1A has a ring-like recess 32 at each end face 12, 14 within a ring-like contact surface 12A, 14A as well as at least one undercut 28 in the sidewall of the recess 32.

As likewise already brought out above it is also possible to attach the spacer element at only one end face to one sheet metal part or to one wall section or hollow cavity providing the spacer element 10—as shown in FIGS. 2A to 2D—has a fastener section with an internal thread or an external thread (not shown) for the attachment of a component 24 to the component assembly by means of a bolt 25 or a nut respectively. Here the spacer element is at least substantially not deformable on attachment to a sheet metal part and is also provided here at one end face 12 with at least one undercut 28 for the form-fitted reception of the sheet metal part, whereby the spacer element is anchored in a manner secure against rotation at the sheet metal part.

Specifically a plurality of undercuts 28 are provided here which are formed in that a plurality of mutually spaced-apart recesses 70 are provided in the ring-like contact surface 12A which form corresponding discrete undercuts 28 in the sidewall 32 of the central recess 33, with both the recesses 70 and the projections 72 of the sidewall 32 formed by them, which form the undercuts 28, also serving for security against rotation. This type of design of the end face is known per se, for example from EP-B-795510 of the present applicants. There, and in EP-B-957273 the use of a wave-shaped groove in the ring-like contact surface 12A from the generation of the undercuts 28 is also described and can also be used here. Since wall material is here only coined into engagement at one end face 12 of the spacer element only one die button 40 is used here. Both the wall section 17A and also the wall section 17B are pre-pierced at 46. FIG. 2B shows the situation prior to use of the die button 40, FIG. 2C the situation thereafter.

In this embodiment the plunger 42 presses from above onto the wall section 17B and onto the spacer element 10 and hereby presses the lower end face 12 and the wall section 17A against the die button projection 41, while the material at the rim of the hole is pressed by the die button into the central recess 33 and into the discrete recesses 70 as well as into the undercuts. If the construction is so effected that the spacer element 10 is first connected to the sheet metal part 16A before it is connected to the sheet metal part 16B then the plunger 42 acts directly on the end face 14 of the spacer element 10.

One can clearly see in FIG. 2C how the sheet metal part or wall material is formed into the recesses 70, into the undercuts 28 and into the cut-out 33 of the spacer element. The die button has precisely the shape which is described in EP-B-795510 and indeed with fewer noses 74 at the die button projection 41 than recesses 70 in the end face 12A of the spacer element. In this way it is ensured that the material is pressed into engagement in at least some recesses 70 and undercuts 28 and indeed without the relative rotary position of the die button 40 and the spacer element 10 having to be determined.

It is however also possible to provide the design which is present at the end face 12 of the spacer element according to FIGS. 2A to 2D at the end face 14. This is shown in FIGS. 3A to 3D. Through the use of the same reference numerals in the FIGS. 3A to 3D as in FIGS. 1A to 1A and 2A to 2D a separate description of the FIGS. 3A to 3D is unnecessary since the previous description also applies in a transferred sense for FIGS. 3A to 3D.

The same applies to the FIGS. 4A to 4D which are only distinguished from the FIGS. 3A to 3D in that the bore 22 is not provided from the outset with a thread 23, with the spacer element 10 having a smoothly pierced cylindrical hole or bore which optionally is designed to receive a thread-forming or thread-cutting bolt, i.e. the spacer element can also have here only a spacer function or an attachment function for the attachment of a further component such as 24 in FIG. 1D by means of a bolt 26.

The FIGS. 5A to 5E show an alternative spacer element 10 in accordance with the invention which is rectangular in an axial cross-section and respectively has two bars 80 and 82 at both end faces 12, 14 with the bars extending parallel to one another and to the adjacent sides 84 of the spacer element and forming respective undercuts 28 at the mutually confronting sides.

Between the bars there is a groove 86 at each end face of the spacer element 10. A threaded bore 23 extends in the axial direction through the centre of the spacer element which, if desired, can also be square in plane view. The die buttons 40 which are shown in FIGS. 5B and 5C each have a substantially rectangular die button projection 41 which can be used for the pressing of the sheet metal material into the undercuts 28. Here also the sheet metal material or the wall material 17A, 17B is pre-pierced and indeed preferably with a rectangular hole from which two oppositely disposed wall regions 90, 92 are formed by the die button projection 41 into the grooves 86 and pressed into intimate contact at the oppositely disposed sides of each groove 86 and into the corresponding undercuts 28, it is also possible to operate with two sheet metal parts 16A and 16B here, or a hollow section 18 can be used. The installed situation is shown in a perspective partly sectioned representation in FIG. 5E. There the radii 92 can also be readily recognized which are formed by the radii 94 which form the transition from the die button projection 41 into the planar end face of the die button 40. Here also—as in all embodiments—it is possible to operate with one die button 40 or with two die buttons 40 as has been described precisely in connection with FIGS. 6A to 6D.

A further possibility for the design of a rectangular spacer element 10 is shown in FIGS. 6A to 6D. Here the two bars 80, 82 are formed by respective grooves 96 and indeed preferably such that both sidewalls of each groove 96 have a respective undercut 28. A further special feature of the embodiments in accordance with the invention of FIGS. 6A to 6D and 7A to 7D lies in the fact that the sheet metal parts 16A and 16B or the wall sections 17A and 17B of the hollow section are not pre-pierced but rather the required rectangular openings are produced by the die button 40. This has two elongate noses extending parallel to each other which are so designed that they cut, in cooperation with the adjacent end face of the spacer element 10, a rectangular piercing slug (not shown) out of the sheet metal material or out of the wall material which is then disposed all through the central passage 99 of the die button. The reference numerals 42 signify in all drawings a tool or plunger which is either flat or has a cut-out 44 (as shown in FIG. 6B) at the side confronting the sheet metal part or the hollow section 18 in order to generate a reaction force on the spacer element 10 or on the sheet metal part 16 or on the hollow section 18 when using the die button arranged at the opposite side of the sheet metal part 16 or the hollow section 18. The FIGS. 7A to 7D are distinguished from those of FIGS. 6A to 6D only in as much as the possibility of using a hollow section 18 instead of the initially separated sheet metal parts 16A and 16B is shown in FIGS. 7B to 7D.

If the spacer element 10 is inserted into a finished hollow cavity 34 of a hollow section 18 of a sheet metal part 16 then the spacer element is introduced from the side into the hollow section and held during the attachment at the sheet metal part or hollow section 18.

It should also be brought out that the sheet metal part 16 or the hollow section 18 is no in way restricted to the design shown here. For example the one sheet metal part 16A or 16B could have the shape of a top hat in cross-section and the respective other part could be formed as a planar sheet metal part. The spacer element 10 could then be attached between the two oppositely disposed "sides" of the top hat or between the top side of the top hat and the planar sheet metal part.

Many other cross-sectional shapes of the sheet metal parts 16 or of the hollow cavity 54 are conceivable, including designs which consist of more then two individual sheet metal parts.

In just the same way the hollow sections 18 which are equipped with the spacer elements in accordance with the invention can have a hardly restricted plurality of shapes including shapes with curved wall sections 17A, 17B, which is also basically possible with sheet metal constructions. Eventually, depending on the degree of the curvature, the end face of the spacer element could also have a curvature matched thereto. In principle no limits are set on the length i.e. the axial heights of the spacer elements. The minimal height is however determined by the design of the undercuts and the necessity to have a certain minimum thread length. It is however also conceivable to screw components such as 24 onto two oppositely disposed sides of the sheet metal part 16 or of the hollow section 18 and optionally to provide different thread sizes for this in the bore of the spacer element 10.

Summarizing the present invention makes it possible to manufacture a component assembly 20 consisting of a spacer element 10 which is secured at two oppositely disposed wall sections 17A, 17B of a sheet metal part 16 forming a hollow cavity 54. The sheet metal part 16 can consist of two welded together sheet metal parts 16A, 16B. Alternatively the hollow cavity 54 can also be formed by the hollow section 18. The spacer element 10 is designed at both ends 12, 14 for the attachment to the wall sections 17A, 17B and has, if required, a fastener section with an internal thread or an external thread for the attachment of a component 24 to the component assembly 20 by means of a bolt 26 or a nut respectively. The spacer element has at least substantially the same shape prior to and after the attachment and thus also the same length. The spacer element 10 is provided at both end faces 12, 14 with respective undercuts 28 which lie behind the respective end face and into which material of respective wall sections 17A, 17B is received in form-fitted manner, whereby the spacer element 10 is secured to the wall sections 17A, 17B and is preferably also secured in a manner secure against rotation. Examples for such component assemblies are to be found in the FIGS. 1 and 3 to 7.

The invention enables the manufacture of a component assembly 20 consisting of a spacer element 10 which is arranged between two mutually oppositely disposed wall sections 17A, 17B of a sheet metal part 16 forming a hollow cavity 54. The sheet metal part 16 can consist of two welded together sheet metal parts 16A, 16B. Alternatively to this the hollow cavity 54 can be formed by a hollow section 18. In this example the spacer element 10 is attached at one end to one of the wall sections 17A and has a fastener section with an internal thread 23 or an external thread for the attachment of a component 24 to the component assembly by means of a bolt 26 or a nut respectively.

The spacer element 10 has, prior to and after the attachment, at least substantially the same shape. Furthermore, the spacer element 10 has at one end face 12 at least one undercut 28, in which material of the one wall section 17A is received in form-fitted manner, whereby the spacer element is fastened in a rotationally secure manner at one end to the sheet metal part to one wall section. The wall section 17B lying opposite to the last named wall section 17A has a hole 46 through which either a bolt 26 can be screwed into an internal thread 23 of the spacer element 10 or through which a shaft part of the spacer element having a thread projects (not shown).

In the component assemblies in accordance with the invention of FIGS. 1, 2, 3 and 4 the spacer element has a central recess 34 at one end face or at each end face 12, 14 within a ring-like contact surface 12A and also at least one undercut 28 in the sidewall of the recess. The sheet metal material of the wall section 17A and/or 17B is received in form-fitted in the undercut 28.

Component assemblies in accordance with FIGS. 2 to 4 are particularly preferred in which a plurality of mutually spaced apart recesses 70 or a groove which is of wave-shape in plane view (not shown) are or is provided in the ring-like contact surface 12A which form correspondingly discrete undercuts 28 in the sidewall of the central recess 33, with both the discrete recesses 70 and also the wave-like groove and the projections 72 of the sidewall, which form the undercuts 28 and which are formed by them or by it, also serving for the security against rotation.

As shown in FIG. 4 the component assembly in accordance with the invention can be provided with a spacer element 10 which has a smoothly pierced cylindrical hole or bore 22 which is optionally designed to receive a thread-forming or a thread-cutting bolt.

The component assembly in accordance with FIGS. 1A to 1D is so designed that the undercut 28 provided there is a ring-like undercut and/or in that the sidewall of the central recess 33 extends at least substantially obliquely to the longitudinal axis so that the recess 33 has, in an axial section, i.e. a plane containing the longitudinal axis, optionally the shape of a concave throat of at least substantially conical shape, optionally a concavely or convexly arched shape. At the end face 12, 14 of the spacer element 10 a rounded transition is preferably present from the ring-like contact surface to the ring-like recess. The sheet metal material of the respective wall sections 17A, 17B is received in form-fitted manner in the respective undercut.

In the component assemblies in accordance with the invention with a central recess 33 at the end face of the spacer element, features providing security against rotation such as noses and/or recesses can be provided with advantage which extend in radial planes, i.e. in planes perpendicular to the longitudinal axis, are provided at the sidewall of the central recess and which form corresponding recesses and/or noses in the material of the respective wall section 17A and 17B.

Spacer elements in accordance with FIGS. 5 to 7 can be particularly cost-favourably manufactured because this can take place in a fast running press in a progressive tool from a section which is at least substantially rectangular and this is faster than the manufacture in a cold heading process, which would be necessary for the elements in accordance with FIGS. 1 to 4. Such component assemblies are characterized in that a spacer element 10 is rectangular or square in the axial cross-section and has at one end face or at both end faces two bars 80, 82 which extend parallel to one another and to the neighbouring sides 84 of the spacer element and which form respective undercuts 28 at the mutually confronting sides. The material of the respective wall section 17A, 17B is received in form-fitted manner in the undercuts 28.

The component assemblies in accordance with FIGS. 6 and 7 are particularly favourable and characterized in that the two bars 80, 82 are formed by respective grooves 86, in that both sidewalls of each groove preferably have a respective undercut 28 and in that the sheet metal material of the respective wall sections 17A, 17B is received in form-fitted manner in these undercuts 28. This design enables the use of a piercing die 40 for the pressing of the wall material into the undercuts 28 which however simultaneously cuts the corresponding hole in the wall section and removes the piercing slug.

Insofar as the spacer element 10 is only secured to one side of the hollow cavity (as shown in FIG. 2) the method can also be designed in such a way that a first sheet metal part 16A is attached to the first end face 12 of the spacer element 10 by means of a first die button 41 which presses the sheet metal material in form-fitted manner into the corresponding undercut 28 or undercuts 28 of the first end face; that a second sheet metal part 16B is arranged at the second end face 14 of the spacer element, with the second sheet metal part 16B having a hole 46 at the position of the second end face 14 which is aligned with the longitudinal axis 88 of the spacer element 10 and that the first and second sheet metal parts 16A, 16B are joined together or to at least one further sheet metal part (not shown) for the formation of a hollow cavity 54 at points 50, 52 remote from the spacer element by other means, for example by spot welding, mechanical joining or by further fastener elements or spacer elements. This other connection takes place after the placement of the second sheet metal part 16B at the second end face of the spacer element.

An alternative method for the manufacture of a component assembly 20 is characterized in that the spacer element 10 is inserted into a hollow cavity 54 of the hollow section 18 or of the sheet metal part 16 which consists of at least one first sheet metal part 16A and one second sheet metal part 16B which are joined together or to at least one further sheet metal part (not shown) for the formation of a hollow cavity, at points 50, 52 remote from the spacer element 10 for example by spot-welding, mechanical joining or by further fastener elements or spacer elements. This insertion takes place in such a way that the first and second end faces 12, 14 of the spacer element 10 lie opposite to respective first and second wall sections 17A, 17B of the hollow section 18. Then, by means of a die button 40 the spacer element 10 is attached at the first end face 12 to the first wall section 17A in that the die button presses material of the first wall section 17A into the corresponding undercut 28 or undercuts 28 of the first end face 12 in form-fitted manner and such that a hole 46 in the second wall section 17B lies opposite to the second end face 14 and is aligned with the longitudinal axis 88 of the spacer element 10.

In the method of the invention the die button or both die buttons serve, during the pressing of the sheet metal material or the material of the respective wall section 17A, 17B, also for a form-fitted inter-engagement of the material and any features 30 providing security against rotation.

In all embodiments all materials can be named as an example for a material of the spacer element which achieve the strength values of class 8 in accordance with the ISO standard in the context of cold deformation, for example a 35B2 alloy in accordance with DIN 1654. The so formed spacer elements are suitable amongst other things for all commercial steel materials for deep drawing quality sheet metal parts and also for aluminium or its alloys. Aluminium alloys in particular those with higher strength can also be used for the spacer elements, for example AlMg5. Spacer elements of higher strength magnesium alloys such as for example AM50 can also be considered.

The invention claimed is:

1. A component assembly (20) consisting of a spacer element (10) which is secured to two oppositely disposed wall sections (17A, 17B) of a hollow metal part (16), said hollow metal part defining a hollow cavity and consisting of first and second welded-together sheet metal parts (16) or being formed by the hollow space (54) of a hollow section (18), wherein the spacer element (10) is designed at first and second ends (12, 14) for attachment to a respective wall section (17A, 17B), wherein the spacer element (10) has at least substantially the same shape prior to or after the attachment to the sheet metal part and wherein the spacer element (10) has first and second ends (12, 14), said ends having respective undercuts (28) into which material of the respective wall section (17A, 17B) is received in form-fitted manner whereby the spacer element (10) is secured to the wall sections (17A, 17B).

2. A component assembly (20) in accordance with claim 1, wherein the spacer element (10) is one of rectangular and square in an axial cross-section and has at at least one of said first and second ends (12, 14) first and second bars (80, 82) extending parallel to one another and to adjacent sides (84) of the spacer element (10), there being respective undercuts (28) at mutually confronting sides of said first and second bars and wherein the material of the respective wall section (17A, 17B) is received in form-fitted manner in said undercuts (28).

3. A component assembly (20) in accordance with claim 2, wherein the first and second bars (80, 82) are formed by respective grooves (96), each groove having first and second sidewalls each having a respective undercut (28) and wherein the material of the respective wall section (17A, 17B) is received in form-fitted manner in said undercuts (28).

* * * * *